United States Patent Office 3,164,517
Patented Jan. 5, 1965

3,164,517
PROCESS OF EFFECTING DIURESIS WITH LOWER ALKYL DISULFAMYLANILINE COMPOUNDS
Frederick C. Novello, Berwyn, Pa., assignor to Merck & Co., Inc., Rahway, N.J., a corporation of New Jersey
No Drawing. Original applications Feb. 7, 1957, Ser. No. 638,701, and Dec. 23, 1959, Ser. No. 854,580. Divided and this application Feb. 13, 1962, Ser. No. 172,884
3 Claims. (Cl. 167—51.5)

This invention is concerned with novel disulfamylaniline compounds having the general structural formula

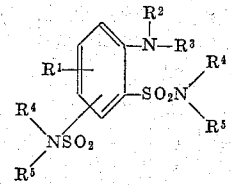

and their non-toxic salts, wherein $R^1$ is halogen such as chlorine, bromine or fluorine, lower alkyl advantageously having from 1 to 5 carbon atoms, lower alkoxy also advantageously containing from 1 to 5 carbon atoms in the alkyl portion of the radical, and nitro or amino groups; $R^2$ is hydrogen or lower alkyl having advantageously from 1 to 5 carbon atoms; $R^3$ is hydrogen, a lower alkyl radical having advantageously from 1 to 5 carbon atoms, a lower alkanoyl advantageously a straight or branched chain alkanoyl radical having from 1 to 12 carbon atoms such as the formyl, acetyl, caproyl, capryl, lauroyl, and the like radicals, mononuclear aroyl such as benzoyl or mononuclear aryl-lower alkanoyl having advantageously from 1 to 3 carbon atoms in the alkanoyl moiety such as phenylacetyl, phenylpropionyl, cinnamoyl and the like; and

is an unsubstituted or substituted amino radical and if substituted $R^4$ and $R^5$ being either alike or dissimilar radicals selected respectively from lower alkyl either straight or branched chain and having advantageously from 1 to 6 carbon atoms, lower alkanoyl having preferably from 1 to 3 carbon atoms or

can represent a heterocyclic ring such as 5- or 6-membered ring selected from the 1-pyrrolidyl, 1-piperidyl, 4-morpholinyl and the like radicals.

The new compounds of this invention are useful chemotherapeutic agents principally because of their diuretic and/or natriuretic properties. The compounds can be administered in therapeutic dosages in conventional vehicles as in the form of a tablet as these compounds are effective upon oral administration as well as upon injection. As the compounds of this invention also are readily soluble in a dilute alkaline medium and in polyethylene glycol solutions, injectable solutions can be prepared by dissolving the desired compound in the selected medium to which preservatives can be added if desired.

The new compounds of this invention also are useful in preparing novel benzothiadiazine - 1,1 - dioxide compounds which also possess diuretic and/or natriuretic properties and which are the subject of my U.S. Patent application Serial No. 582,082, filed May 2, 1956, now Patent No. 2,809,194, of which the present application is a continuation-in-part.

The disulfamylaniline derivatives of this invention can be prepared by a variety of methods. Two processes which have been found to be particularly well adapted to the preparation of these compounds can be illustrated as follows:

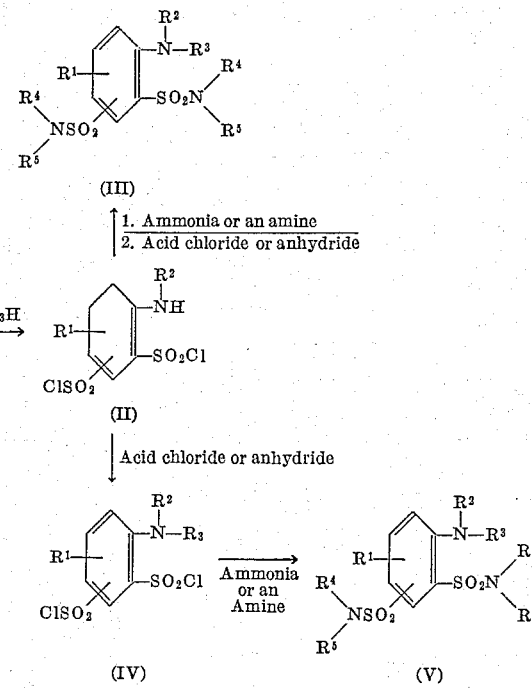

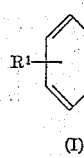

Few of the disulfonyl chloride compounds (II) are known, and those which have not been described in the literature can be prepared readily by chlorosulfonation of the selected aniline compound (I), preferably in the presence of an alkali metal halide, for example sodium, potassium or lithium chloride. For all practical purposes, sodium chloride can be used as it is readily available, cheap, and in its presence the reaction proceeds quite smoothly. As the reaction between these ingredients generally is quite vigorous, it is preferred to add the aniline derivative to the chlorosulfonic acid dropwise with stirring and cooling. After all of the aniline derivative has been added, the alkali metal chloride is added in small portions to allow for the evolution of hydrogen chloride at a moderate rate. Following this, the mixture is heated at between about 100°–200° C. preferably in an oil bath.

The disulfonyl chloride (II) thus obtained then can be converted to the disulfamyl derivative (III) by treatment with ammonia or a primary or secondary amine by well known methods. If desired, following the reaction with ammonia or a primary or secondary amine the resulting product can be reacted with the desired acylating agent advantageously by heating on a steam bath to form the corresponding acylated aniline compound. The acylating agent can be any of the agents described below for this purpose.

Alternatively, the disulfonyl chloride compound (II) can be acylated with an organic acid chloride or anhydride, the acid advantageously being selected from a lower alkanoic acid such as acetic acid, propionic acid, caproic acid, capric acid, stearic acid and the like, or a mononuclear aryl-monocarboxylic acid or a mononuclear aryl-lower alkanoic acid such as benzoic acid, phenylacetic acid, phenylpropionic acid, cinnamic acid, and the like. This reaction proceeds quite smoothly with moderate heating on the steam bath yielding the N-acyl-disulfonyl chloride derivative (IV).

The acylated compound (IV) then can be converted to the corresponding amide by treatment with ammonia or a primary or secondary amine by the method described above for conversion of the disulfonyl chloride, compound (II), to the disulfamyl compound (III).

The desired salt of the disulfamylaniline compounds of this invention wherein $R^4$ or $R^5$ is hydrogen can be prepared advantageously by dissolving the selected compound in an aqueous or alcoholic solution of an alkali metal hydroxide, and, if desired, isolating the salt by evaporating the solvent. Any of the conventional alkali metal salts such as sodium, potassium, lithium or the like salt, can be prepared by this method or by other methods known to organic chemists.

The preparation of the compounds is more fully described in the following examples. It is to be understood, however, that the examples are illustrative of the compounds embraced by this invention and of the methods for their preparation and are not to be construed as limiting the invention to the particular compounds or methods specifically described.

EXAMPLE 1

*5-Chloro-2,4-Disulfamylaniline* m-Chloroaniline (64 g., 0.5 mole) was added dropwise with stirring to 375 ml. of chlorosulfonic acid in a 3-liter, round bottom, 3-necked flask cooled in an ice bath. Sodium chloride (350 g.) was added portionwise over a period of 1–2 hours and the mixture then heated gradually in an oil bath to 150° C. After 3 hours at 150–160° C., the flask was cooled thoroughly in an ice bath and the contents treated with a liter of cold water. The product was extracted with ether and the extract washed with water and dried over sodium sulfate. After removal of ether on the steam bath, the residual 5-chloroaniline-2,4-disulfonyl chloride, which may be crystallized from benzene-hexane, M.P. 130–132° C., was cooled in an ice bath and treated with 150 ml. of 28% ammonium hydroxide in a 2-liter Erlenmeyer flask. The mixture was heated on the steam bath for 1 hour, cooled and the product collected on the filter, washed with water and dried. Upon crystallization from dilute alcohol, 5-chloro-2,4-disulfamylaniline was obtained as colorless needles, M.P. 251–252° C.

Analysis for $C_6H_8ClN_3O_4S_2$—Calculated: C, 25.22; H, 2.82; N, 14.71. Found: C, 25.48; H, 2.81; N, 14.68.

EXAMPLE 2

*6-Chloro-2,4-Disulfamylaniline* o-Chloroacetanilide (15.2 g.) was added portionwise to 120 ml. chlorosulfonic acid at room temperature followed by portionwise addition of 100 g. of sodium chloride over 1 hour. The mixture then was heated gradually to 150° C. in an oil bath over a ½ hour period and then maintained at 150° C. for 2 hours. After cooling thoroughly in an ice bath, the reaction mixture was treated with 500 ml. of ice water and the product taken up in ether and washed with water and dried over sodium sulfate. After removal of ether by evaporation on the steam bath, the residual disulfonyl chloride was cooled in an ice bath and treated with 50 ml. of 28% ammonium hydroxide. The ammoniacal solution was heated on the steam bath for 1 hour, cooled and the product collected on the filter. Crystallization from dilute alcohol gave 6-chloro-2,4-disulfamylaniline as colorless needles, M.P. 242–244° C.

Analysis for $C_6H_8ClN_3O_4S_2$—Calculated: C, 25.22; H, 2.82; N, 14.71. Found: C, 25.52; H, 2.75; N, 14.59.

EXAMPLE 3

*5-Bromo-2,4-Disulfamylaniline* m-Bromoaniline (86 g., 0.5 mole) was added dropwise over a period of 1 hour to 375 ml. of chlorosulfonic acid cooled in an ice bath. Sodium chloride (350 g.) was added portionwise over 2 hours and the mixture then heated in an oil bath at 150° C. for 3 hours. After thorough cooling in an ice bath, the reaction mixture was treated with one liter of ice water. The product was taken up in ether, washed with water and dried. After removal of solvent on the steam bath, the residue was cooled in an ice bath and treated with 150 ml. of 28% ammonium hydroxide. After the initial vigorous reaction had subsided, the mixture was warmed on the steam bath for 1 hour, cooled and the precipitate collected on the filter. Crystallization from dilute alcohol gave 5-bromo-2,4-disulfamylaniline as colorless needles, M.P. 265–267° C.

Analysis for $C_6H_8BrN_3O_4S_2$—Calculated: C, 21.82; H, 2.44; N, 12.73. Found: C, 22.04; H, 2.72; N, 12.72.

EXAMPLE 4

*2,4-Disulfamyl-5-Methylaniline*

By replacing the m-bromoaniline employed in Example 3 by an equimolecular quantity of m-toluidine (53.5 g.) and following substantially the same procedure described in Example 3, 2,4-disulfamyl-5-methylaniline was obtained as colorless needles, melting point 246–247° C.

Analysis for $C_7H_{11}N_3O_4S_2$—Calculated: C, 31.69; H, 4.18; N, 15.84. Found: C, 31.68; H, 3.97; N, 15.84.

EXAMPLE 5

*4-Chloro-2,5-Disulfamylaniline*

By replacing the m-bromoaniline employed in Example 3 by an equimolecular quantity of 5-amino-2-chlorbenzene-sulfonic acid, and following substantially the same procedure described in Example 3, there was obtained 4-chloro-2,5-disulfamylaniline as colorless needles, M.P. 289–290° C.

Analysis for $C_6H_8ClN_3O_4S_2$—Calculated: C, 25.22; H, 2.82; N, 14.71. Found: C, 25.51; H, 2.88; N, 14.58.

EXAMPLE 6

*2,4-Disulfamyl-5-Methoxyaniline*

Chlorosulfonic acid (150 ml.) was added dropwise over 30 minutes with stirring to 24.6 g. (0.2 mole) of m-anisidine cooled in an ice bath. After addition of chlorosulfonic acid was complete, 140 g. of sodium chloride was added portionwise over 1 hour. The mixture was heated for 2 hours on the steam bath and then for 3 hours in an oil bath, 150–160° C., cooled thoroughly in an ice bath and treated with 500 ml. of ice water. The product was taken up in ether, washed with water, dried and the solvent evaporated on the steam bath. The residue was cooled in an ice bath and treated with 100 ml. of 28% ammonium hydroxide. The precipitate was collected on the filter, washed with water and recrystallized from water to give 2,4-disulfamyl-5-methoxyaniline as colorless needles, M.P. 252–253° C.

Analysis for $C_7H_{11}N_3O_5S_2$—Calculated: C, 29.89; H, 3.94; N, 14.94. Found: C, 30.12; H, 4.09; N, 14.93.

EXAMPLE 7

2,4-Disulfamyl-5-Nitroaniline

To a solution of 27.6 g. of m-nitroaniline in 150 ml. chlorosulfonic acid, 140 g. of sodium chloride was added portionwise with stirring over 1 hour. After heating at 160° C. for 2 hours, the reaction mixture was cooled in ice, treated with 1500 ml. of ice water and the product extracted with ether. The ethereal extract was dried over anhydrous sodium sulfate, filtered and evaporated to dryness on the steam bath. The residue was cooled in an ice bath and treated with 100 ml. of 28% ammonium hydroxide. After heating on the steam bath for one hour, the reaction mixture was cooled and the solid collected on the filter. Recrystallization from water gave 2,4-disulfamyl-5-nitroaniline as yellow needles, M.P. 260–262° C.

Analysis for $C_6H_8N_4O_6S_2$—Calculated: C, 24.32; H, 2.72; N, 18.91. Found: C, 24.53; H, 2.71; N, 19.11.

EXAMPLE 8

5-Amino-2,4-Disulfamylaniline

A solution of 3 g. of 2,4-disulfamyl-5-nitroaniline, obtained as described in Example 7, in 150 ml. of ethanol was shaken with hydrogen in the presence of 250 mg. of platinum oxide until hydrogen absorption ceased (4 hours). The catalyst was removed by filtration, the alcoholic solution concentrated to dryness in vacuo and the residue recrystallized from water. 5-amino-2,4-disulfamylaniline was obtained as pale yellow needles, M.P. 245–246° C. (dec.).

Analysis for $C_6H_{10}N_4O_4S_2$—Calculated: C, 27.06; H, 3.79; N, 21.04. Found: C, 27.37; H, 3.95; N, 21.06.

EXAMPLE 9

5-Chloro-2,4-Disulfamylacetanilide 5-chloroaniline-2,4-disulfonyl chloride (3.8 g.), prepared as described in Example 1, was dissolved in 10 ml. acetic anhydride and after ½ hour at room temperature cooled in ice and the product collected on the filter. After crystallization from a mixture of benzene-hexane, 5-chloroacetanilide-2,4-disulfonyl chloride was obtained and, after separation by filtration, was added portionwise to 50 ml. of liquid ammonia and the ammonia allowed to evaporate at room temperature. The residue was dissolved in 10 ml. of water, acidified with 5 ml. of concentrated hydrochloric acid, and the crystalline product collected on the filter. Recrystallization from water gave 5-chloro-2,4-disulfamylacetanilide as colorless needles, M.P. 261–262° C. (dec.).

Analysis for $C_8H_{10}ClN_3O_5S_2$—Calculated: C, 29.31; H, 3.08; N, 12.82. Found: C, 29.49; H, 3.25; N, 12.85.

EXAMPLE 10

N-Benzoyl-5-Chloro-2,4-Disulfamylaniline

A solution of 6.6 g. of 5-chloroaniline-2,4-disulfonyl chloride, prepared as described in Example 1, in 10 ml. of benzoyl chloride was allowed to stand at room temperature for 17 hours. The crystalline product was collected, washed with a small amount of benzene and crystallized from benzene-hexane to give N-benzoyl-5-chloroaniline-2,4-disulfonyl chloride as colorless needles, M.P. 171–173° C. (dec.). The thus obtained disulfonyl chloride (7.4 g.) was added to excess liquid ammonia (50–75 ml.) and allowed to evaporate to dryness at room temperature. The residue was crystallized from dilute alcohol to afford N-benzoyl-5-chloro-2,4-disulfamylaniline, M.P. 266° C. (dec.).

Analysis for $C_{13}H_{10}ClN_3O_4S_2$—Calculated: C, 40.05; H, 3.10; N, 10.78. Found: C, 39.96; H, 3.47; N, 10.68.

EXAMPLE 11

N-Butyryl-5-Chloro-2,4-Disulfamylaniline

A solution of 5.4 g. of 5-chloroaniline-2,4-disulfonyl chloride, prepared as described in Example 1, in a mixture of 10 ml. of butyric anhydride and 10 ml. of benzene was allowed to stand at room temperature for 1 hour. After cooling in an ice bath, the crystalline product was collected and crystallized from a mixture of benzene-hexane to give N-butyryl-5-chloroaniline-2,4-disulfonyl chloride as colorless needles, M.P. 121–122° C. The thus obtained disulfonyl chloride (9.9 g.) was added portionwise to excess liquid ammonia (100 ml.) and allowed to evaporate to dryness at room temperature. The residue was treated with water and the product collected on the filter. Recrystallization from aqueous alcohol yielded N-butyryl-5-chloro-2,4-disulfamylaniline.

EXAMPLE 12

N-Caproyl-5-Chloro-2,4-Disulfamylaniline 5-chloroaniline-2,4-disulfonyl chloride (5 g.), prepared as described in Example 1, was dissolved in 10 ml. of n-caproic anhydride by warming gently on the steam bath and then allowed to stand at room temperature for 2 hours. The crystalline product formed was collected and recrystallized from hexane to give N-caproyl-5-chloroaniline-2,4-disulfonyl chloride as colorless needles, M.P. 91–93° C. The disulfonyl chloride thus obtained (9.9 g.) was added portionwise to 50 ml. of liquid ammonia. The solution was allowed to evaporate to dryness at room temperature and the residual solid then was treated with 50 ml. of water and the product collected on the filter. Recrystallization from aqueous alcohol afforded N-caproyl-5-chloro-2,4-disulfamylaniline as colorless needles, M.P. 213–215° C.

EXAMPLE 13

2,4-Disulfamyl-5-Fluoro-N-Phenylacetylaniline

By replacing the m-chloroaniline in Example 1 by an equimolecular quantity of m-fluoroaniline and following substantially the same procedure described in Example 1 for the preparation of 5-chloroaniline-2,4-disulfonyl chloride, 5-fluoroaniline-2,4-disulfonyl chloride was prepared. The thus obtained disulfonyl chloride was dissolved in phenylacetyl chloride and allowed to stand at room temperature for 17 hours. The product was collected and washed with benzene to give 5-fluoro-N-phenylacetylaniline-2,4-disulfonyl chloride which when added to excess liquid ammonia and allowed to evaporate to dryness at room temperature gave 2,4-disulfamyl-5-fluoro-N-phenylacetylaniline.

EXAMPLE 14

5-Chloro-2,4-Di-(N-Methylsulfamyl)Aniline 5-chloroaniline-2,4-disulfonyl chloride (6.6 g.), prepared as described in Example 1, was added portionwise to 40% aqueous methylamine (50 ml.). After heating on the steam bath for 1 hour, the reaction mixture was cooled and the crystalline solid collected on the filter. Recrystallization from aqueous alcohol gave 5-chloro-2,4-di-(N-methylsulfamyl)aniline as colorless needles, M.P. 175.5–178° C.

Analysis for $C_8H_{12}ClN_3O_4S_2$—Calculated: C, 30.62; H, 3.86; N, 13.39. Found: C, 30.85; H, 3.81; N, 13.34.

EXAMPLE 15

5-Chloro-2,4-Di-(N-Methylsulfamyl)-N-Formylaniline

A mixture of 5-chloro-2,4-di-(N-methylsulfamyl)aniline (2.8 g.), prepared as described in Example 14, and thyl orthoformate (4 ml.) was heated at 110–130° C. or one hour and then for an additional 15 minutes at 30–150° C. Upon cooling, a solid residue was obtained which was separated by filtration and recrystallized from aqueous alcohol to give 5-chloro-2,4-di-(N-methylsulfamyl)-N-formylaniline as colorless plates, M.P. 192–195° C.

Analysis for $C_9H_{12}ClN_3O_5S_2$—Calculated: C, 31.63; H, 3.54; N, 12.29. Found: C, 31.99; H, 3.68; N, 12.29.

EXAMPLE 16

5-Chloro-2,4-Di-(N-Acetylsulfamyl)Acetanilide

A mixture of 5-chloro-2,4-disulfamylaniline (2.9 g.) prepared as described in Example 1, and acetic anhydride (10 ml.) was treated with two drops of concentrated sulfuric acid. After one hour the crystalline mass was cooled in ice and the product collected on the filter and washed with water. Recrystallization from alcohol afforded 5-chloro-2,4-di-(N-acetylsulfamyl)acetanilide as colorless needles, M.P. 222–224° C.

Analysis for $C_{12}H_{14}ClN_3O_7S_2$—Calculated: C, 34.99; H, 3.43; N, 10.20. Found: C, 34.91; H, 3.77; N, 10.10.

EXAMPLE 17

5-Chloro-2,4-Di-(1-Piperidylsulfonyl)Aniline

A solution of 5-chloroaniline-2,4-disulfonyl chloride (9.7 g.), prepared as described in Example 1, in benzene (200 ml.) was added dropwise over 10 minutes to piperidine (50 ml.). After heating on the steam bath for 3 hours, the mixture was cooled and washed with two 50 ml. portions of water, one 50 ml. portion of dilute hydrochloric acid and one 50 ml. portion of water. The benzene solution was dried over sodium sulfate and concentrated to dryness in vacuo. Recrystallization of the residue from ethanol afforded 5-chloro-2,4-di-(1-piperidylsulfonyl)aniline, as colorless needles, M.P. 162–164° C.

Analysis for $C_{16}H_{24}ClN_3O_4S_2$—Calculated: C, 45.75; H, 5.76; N, 10.00. Found: C, 46.04; H, 5.67; N, 10.00.

EXAMPLE 18

5-Chloro-2,4-Di-(N,N-Dimethylsulfamyl)Aniline

A mixture of 5-chloroaniline-2,4-disulfonyl chloride (9.7 g.), prepared as described in Example 1, and 25% aqueous dimethylamine (100 ml.) was heated on the steam bath for 1½ hours, cooked and the product which separated removed by filtration and then recrystallized from ethanol to give 5-chloro-2,4-di-(N,N-dimethylsulfamyl)aniline as colorless needles, M.P. 182–182.5° C.

Analysis for $C_{10}H_{16}ClN_3O_4S_2$—Calculated: C, 35.14; H, 4.51; N, 12.29. Found: C, 35.53; H, 4.78; N, 12.30.

EXAMPLE 19

5-Chloro-2,4-Disulfamyl-N-Methylaniline

By replacing the m-chloroaniline employed in Example 1 by an equimolecular quantity of N-methyl-m-chloroaniline and following substantially the same procedure described in Example 1 there is obtained 5-chloro-2,4-disulfamyl-N-methylaniline.

EXAMPLE 20

5-Butyl-2,4-Di-(N-n-Butylsulfamyl)-N,N-Lauroylpropylaniline

By replacing the m-chloroaniline employed in Example 1 by an equimolecular quantity of m-butyl-N-propylaniline and following substantially the same procedure described for the chlorosulfonation of the aniline derivative there described, there is obtained 5-butyl-N-propylaniline-2,4-disulfonyl chloride. Five grams of the thus obtained disulfonyl chloride is dissolved in lauroyl chloride (10 ml.) and heated briefly on the steam bath. The reaction mixture then was allowed to cool to room temperature and the solid product thus formed collected on the filter. After crystallization from a mixture of benzene-hexane, 5-butyl - N,N - lauroylpropylaniline-2,4-disulfonyl chloride is obtained and the disulfonyl chloride added portionwise to n-butylamine (50 ml.) and heated for approximately one hour on the steam bath. After cooling to room temperature, the solid product is collected on the filter, washed with water and crystallized from a mixture of alcohol and water yielding 5-butyl-2,4-di-(N-n-butylsulfamyl)-N-N-lauroylpropylaniline.

EXAMPLE 21

2,4-Di-(N,N-n-Butylethylsulfamyl-5-Methylaniline

By replacing the m-chloroaniline employed in Example 1 by an equimolecular quantity of m-toluidine and following substantially the same procedure described for the chlorosulfonation of the aniline derivative there described, there is obtained 5-methylaniline 2,4-disulfonyl chloride. Five grams of the thus obtained disulfonyl chloride then is added portionwise to n-butylethylamine and heated for approximately one hour on the steam bath. After cooling to room temperature the product is collected on the filter and washed with water yielding 2,4-di-(N,N-n-butylethylsulfamyl)-5-methylaniline.

EXAMPLE 22

5-Propoxy-2,4-Di-(4-Morpholinylsulfonyl)-N-Butylaniline

By replacing the m-chloroaniline employed in Example 1 by an equimolecular quantity of m-propoxy-N-butylaniline and following substantially the same procedure described for the chlorosulfonation of the aniline derivative there described, there is obtained 5-propoxy-N-butylaniline-2,4-disulfonyl chloride. After separation by filtration, five grams of the thus obtained disulfonyl chloride is added portionwise to morpholine (50 ml.) and heated for approximately one hour on the steam bath. After cooling to room temperature, the solid product is collected on the filter, washed with water and crystallized from a mixture of alcohol and water yielding 5-propoxy-2,4-di-(4-morpholinylsulfonyl)-N-butylaniline.

EXAMPLE 23

2,4-Di-(N,N-Dimethylsulfamyl)-5-Propoxy-N-Cinnamoylaniline

By replacing the m-chloroaniline employed in Example 1 by an equimolecular quantity of m-propoxyaniline and following substantially the same procedure described for the chlorosulfonation of the aniline derivative there described, there is obtained 5-propoxyaniline-2,4-disulfonyl chloride. Five grams of the thus obtained disulfonyl chloride is dissolved in cinnamoyl chloride (10 ml.) and heated briefly on the steam bath. The reaction mixture then is allowed to cool to room temperature and the solid product thus formed collected on the filter. After crystallization from a mixture of benzenehexane, 5-propoxy-N-cinnamoylaniline-2,4-disulfonyl chloride is obtained. After separation by filtration, the disulfonyl chloride is added portionwise to 25% aqueous dimethylamine (50 ml.) and heated for approximately one hour on the steam bath. After cooling to room temperature, the solid product is collected on the filter and washed with water yielding 2,4-di-(N,N-dimethylsulfamyl-5-propoxy-N-cinnamoylaniline.

EXAMPLE 24

Sodium Salt of 5-Chloro-2,4-Disulfamylaniline 5-chloro-2,4-disulfamylaniline, obtained as described in Example 1, is dissolved in alcoholic sodium hydroxide (2 equivalents) and the solvent then evaporated in vacuo yielding the sodium salt of 5-chloro-2,4-disulfamylaniline.

EXAMPLE 25

*Pressed Tablets Comprising 0.5 g. Active Ingredient*

| Ingredients: | Quantity grams |
|---|---|
| 5-chloro-2,4-disulfamylaniline | 500.0 |
| Starch paste, 12½%, 100 cc., allow | 12.5 |
| Total | 512.5 |
| Starch, USP, corn | 25.0 |
| Magnesium stearate | 5.5 |
| Total | 543.0 |

The 5-chloro-2,4-disulfamylaniline is granulated with the starch paste and while moist passed through a No. 14 screen, dried at 45° C. for 20 hours and then passed three times through a No. 14 screen. The starch then is passed through a No. 90 bolting cloth onto the granulation and all ingredients are blended thoroughly. Then the magnesium stearate is passed through a No. 90 bolting cloth onto the granulation and these ingredients are blended after which the granulation is compressed into tablets using a 14/32" flat, beveled, scored punch having a thickness of 0.205±0.005" yielding 1,000 tablets, each weighing 0.543 gram and having a hardness of 6 kgs. measured by the Monsanto Chemical Company Tablet Hardness Tester Apparatus, and a disintegration time of 5 minutes when tested on the USP Tablet Disintegrating Apparatus (U.S. Pharmacopeia, 15th edition, page 937).

While the above examples describe the preparation of certain illustrative compounds embraced by the general structure in column 1 and a certain specific dosage form suitable for administering the novel compounds of this invention in human therapy, it is to be understood that the invention is not to be limited by these examples or by the specific reaction conditions described for the preparation of the compounds or by the specific ingredients in the pharmaceutical preparation, but is understood to embrace variations and modifications falling within the scope of the appended claims.

This application is a division of my copending U.S. applications, Serial Nos. 854,580, filed November 23, 1959, and 638,701, filed February 7, 1957, both now abandoned, and a continuation in part of my U.S. application, Serial No. 582,082, filed May 2, 1956, now Patent 2,809,194, issued October 8, 1957.

What is claimed is:

1. The process of effecting diuresis which comprises administering a diuretic amount of a disulfamylaniline compound of the formula

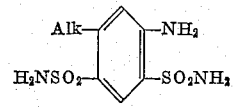

wherein Alk is lower alkyl.

2. The process of effecting diuresis which comprises administering a diuretic amount of 5-methyl-2,4-disulfamylaniline.

3. A process for the treatment of conditions associated with excess fluid retention and excess electrolyte retention which comprises administering to a subject having at least one of said conditions a therapeutic amount of 5-methyl-2,4-disulfamylaniline.

References Cited in the file of this patent

UNITED STATES PATENTS

| 2,835,702 | Schultz | May 20, 1958 |
| 2,947,742 | Cheney et al. | Aug. 2, 1960 |
| 2,965,655 | Novello | Dec. 20, 1960 |
| 2,965,656 | Novello | Dec. 20, 1960 |
| 2,970,154 | Werner et al. | Jan. 31, 1961 |
| 3,019,245 | Novello | Jan. 30, 1962 |
| 3,060,206 | Novello | Oct. 23, 1962 |
| 3,066,156 | Ziegler | Nov. 27, 1962 |

OTHER REFERENCES

David et al.: J. Pharmacy and Pharmacology, vol. 12, 1960, pp. 65–73.

Boggiano et al.: J. Pharmacy and Pharmacology, vol. 12, 1960, pp. 497–500.